Aug. 30, 1955          A. TOWNHILL          2,716,581
PISTON
Filed Oct. 13, 1951
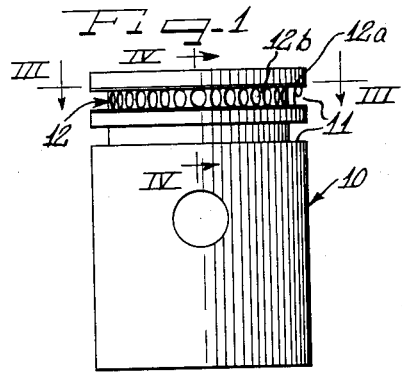
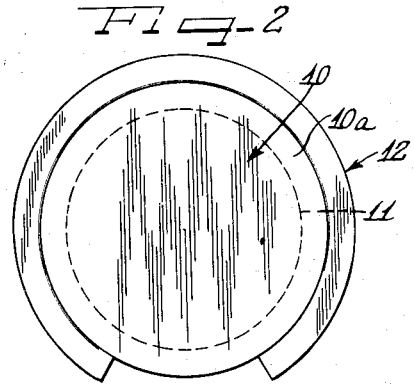
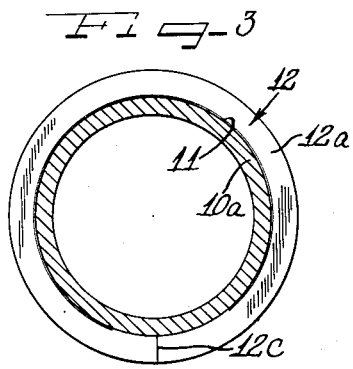
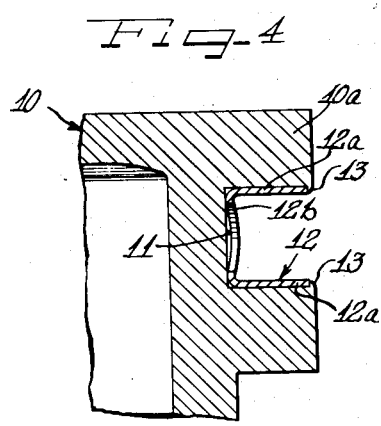
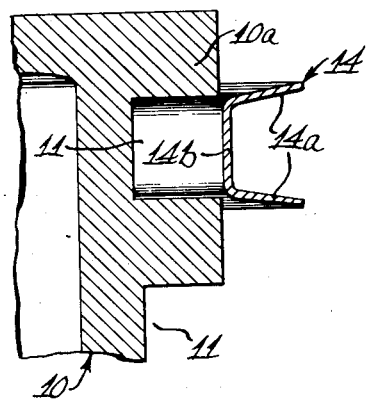
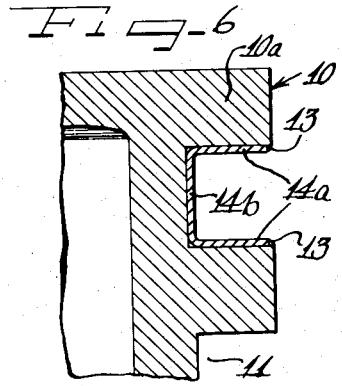
Inventor
Arthur Townhill

United States Patent Office 2,716,581
Patented Aug. 30, 1955

2,716,581

PISTON

Arthur Townhill, East Cleveland, Ohio, assignor to Thompson Products, Inc., Cleveland, Ohio, a corporation of Ohio Application October 13, 1951, Serial No. 251,168

3 Claims. (Cl. 309—14)

This invention relates to reinforced groove constructions, and more particularly to pistons having piston ring grooves lined with reinforcing channel inserts receiving the piston rings.

The invention will be hereinafter described as specifically embodied in a piston for an internal combustion engine, but it should be understood that the principles of this invention, in general, relate to groove constructions having linings which increase the wear resistance and strength of the groove.

In accordance with this invention, a piston is equipped with conventional grooves for receiving piston rings. The groove for receiving the top or fire piston ring, adjacent the head of the piston, is lined with a channel ring insert. This channel ring insert is composed of a material that has better wearing properties than the material forming the body of the piston. Suitable good wearing materials are cast iron and S. A. E. 1040 steel.

The insert ring is split so that it can be expanded over the head of the piston into the ring groove. In contrast with the piston ring, the insert ring is formed with a closing tension that will tend to reclaim any gap that is formed between the ends of the ring when it is expanded for mounting on a piston. The ring has top and bottom legs connected by a web. The legs snugly hug the sides of the ring groove while the web is preferably bottomed on the bottom of the ring groove.

In order to insure maintenance of a tight fit of the insert ring in the ring groove, the insert ring is preferably formed with a web section that can be resiliently deformed to maintain the legs in tight engagement with the side walls of the groove, or is initially formed with inclined legs that are deflected into tight engagement with the side walls of the ring groove. In addition, the piston material can be staked or peened over the ends of the legs to further secure the insert in the groove.

A feature of the invention therefore resides in the reinforcement of a piston ring groove by a U-shaped insert ring of better wearing material than the piston and adapted to receive the piston ring therein to protect the piston against wear.

Another feature of the invention resides in the provision of a groove reinforcing channel member with a deflectible portion to maintain tight engagement between the insert and the groove wall.

A further feature of the invention resides in the provision of an insert ring for a piston groove which can be expanded over the head of the piston and snugly seated in the groove to reinforce the head of the piston and protect the piston against wear from the piston ring.

It is, then, an object of this invention to provide a reinforced groove construction having a good wearing insert ring locked in a groove.

Another object of this invention is to provide a piston with a reinforced ring groove affording superior wear resistance and adding to the strength of the piston.

Another object of the invention is to provide a piston with a fire ring groove that is reinforced by an insert channel ring locked therein in tight engagement therewith.

A still further object of the invention is to provide a piston having at least the fire ring groove thereof reinforced with a channel ring having an apertured deflectible web portion.

A still further object of the invention is to provide an internal combustion engine piston with a fire ring groove that is reinforced by a U-shaped cast iron or steel ring having legs deformed into tight engagement with the side walls of the groove.

Other and further features and objects of the invention will be apparent to those skilled in the art from the following detailed description of the annexed sheet of drawings which, by way of preferred examples only, illustrate two embodiments of the invention.

On the drawings:

Figure 1 is an elevational view of a piston for an internal combustion engine equipped with one form of groove reinforcing insert in the fire ring groove thereof in accordance with this invention.

Figure 2 is a plan view of the piston of Figure 1 illustrating the manner in which the insert can be expanded to fit over the head of the piston for mounting in the groove.

Figure 3 is a transverse horizontal cross-sectional view taken along the line III—III of Figure 1.

Figure 4 is an enlarged fragmentary vertical cross-sectional view taken along the line IV—IV of Figure 1.

Figure 5 is a view similar to Figure 4 but illustrating a different form of insert ring prior to seating the ring in the piston groove.

Figure 6 is a view similar to Figure 4 illustrating the ring of Figure 5 seated in the groove.

As shown on the drawings:

In Figure 1 the reference numeral 10 designates generally a piston for an internal combustion engine composed of aluminum or other lightweight alloy. The piston has a plurality of piston ring grooves 11 including a groove immediately adjacent the head of the piston for carrying the so-called fire ring (not shown) adjacent the head. This fire ring groove 11 is reinforced, according to this invention, by an insert ring 12. The insert ring 12 is composed of material having better wear resisting properties than the body of the piston. Suitable materials are cast iron and steels of the S. A. E. 1040 type. The insert ring 12 is split and in its normal free state the ends of the ring are held in abutted relation due to the closing tension of the ring. However, the ring can be expanded to open up a gap between the ends thereof as shown in Figure 2, and the expanded ring can be forced over the head of the piston 10 to be snapped in the ring groove due to the closing resiliency of the ring in contradistinction to the opening resiliency of a piston ring.

The ring 12 has side legs 12a connected by an apertured web 12b. The ring groove 11 is deeper than the length of the legs 12a and is narrower than the height of the web 12b so that when the insert ring 12 is seated in the groove 11 the legs 12a will terminate inwardly of the outer face of the piston and the web 12b will be distorted. As shown in Figure 4, the web 12b is bowed outwardly from the bottom of the groove 11. This bowing of the web exerts a continuous pressing force on the legs 12a to maintain these legs in tight engagement with the top and bottom walls of the ring groove. At the same time, the apertures in the web 12b relieve the pressing load to a sufficient extent so that the load will be substantially even along the full length of each leg. It is desirable that such an even load be maintained to prevent a tendency for the insert ring to work out of the ring groove. This tendency is enhanced when the inner ends of the legs press against the walls of the ring groove with a greater force than the outer ends of the legs.

If desired, as also shown in Figure 4, the outer end portions of the side walls of the ring groove 11 can be staked or peened over the outer edges of the legs 12a of the insert ring 12 as at 13. This peening or staking will prevent the ring from working outwardly in the groove.

When the ring 12 is seated in the groove, the ends of the ring will be abutted together as shown at 12c, and this abutting relation will be maintained by the inherent closing tension of the ring.

The insert ring receives the conventional piston ring or ring assembly therein in the same manner as a non-reinforced piston groove. The legs 12a and 12b of the insert, however, will protect the top and bottom walls of the piston groove against wear by the action of the piston ring. In addition, the insert will reinforce the head portion 10a of the piston overlying the groove 11 thereby protecting the head against deflection.

In the embodiment shown in Figures 5 and 6, the piston 10 has the fire ring groove 11 thereof equipped with a reinforcing insert 14 of better wearing material than the piston. This ring 14, in its free state, has side legs 14a diverging outwardly from the base web 14b so that the channel defined by the ring has a wider open end than the inner end thereof. Like the ring 12, the ring 14 is split but has an inherent closing tension for maintaining the ends in abutted together relation. The web 14b is imperforate but when the legs 14a are deflected into parallelism when seated in the ring groove, as shown in Figure 6, the pressing loads of the legs on the sides of the piston groove are substantially equal along the length of the legs because the outer ends of the legs have been deflected more than the inner ends and, in tending to spring back to their original shape, they will exert an increased pressing load that will offset for the increased stiffness of the inner ends of the legs adjacent the solid web section 14b. The piston can be staked or peened at 13 over the outer edges of the legs 14a in the same manner as described above in connection with Figure 4. The head section 10a of the piston will also be reinforced in the same manner as described in connection with Figure 4.

While, in the above descriptions, only the top or fire groove has been illustrated as reinforced with a channel insert, it should be understood that all or any of the piston grooves of a piston could be reinforced in an identical manner. The most beneficial results are obtained by reinforcing the fire groove, however, since this groove is subjected to the most abuse, the high temperatures, and is adjacent a thin section of the piston head, where it can effectively reinforce this section.

From the above descriptions, it will be understood that the invention provides a reinforced groove construction especially for internal combustion engine pistons wherein an insert ring of better wearing material than the piston, is locked in the groove for receiving a piston ring therein.

It will be understood that modifications and variations may be effected without departing from the scope of the novel concepts of the present invention.

I claim as my invention:

1. A piston having a reinforced ring groove which comprises a piston body having a peripheral groove therearound near the head end thereof, a resilient split channel ring of better wearing material than said piston body seated in said groove, said ring being adapted to be expanded over the head of the piston for snapping into said groove and having a closing tension reclaiming any gap between the ends thereof, said channel member having an inner web and side legs projecting outwardly therefrom, said side legs terminating inwardly from the periphery of said piston, said piston having portions of the body member deformed over the outer ends of the side legs to hold the channel ring in the groove, and said inner web urging said side legs into uniformly tight surface engagement with the side walls of the groove.

2. A reinforced groove construction for a piston comprising a piston body member having a groove therein with side and bottom walls, a channel insert in said groove having side legs and a connecting web for lining said grooves, said side legs lying substantially coextensive with said side walls, said web holding said side legs in uniformly tight engagement with said side walls and said web having apertures therein sufficiently relieving the pressing load thereof to allow elastic deformation of the web whereby the pressure of said side legs against said side walls is uniform across each thereof.

3. A reinforced groove construction for a piston comprising a piston body member having a groove therein with side and bottom walls, a channel insert in said groove having side legs and a connecting web for lining said groove, said side legs lying substantially coextensive with said side walls, said web holding said side legs in uniformly tight engagement with said side walls, the outer edges of said side walls being deformed inwardly to secure said channel insert in place in said groove with said web lying against the bottom wall of said groove, and said web having apertures therein sufficiently relieving the pressing load thereof to allow elastic deformation of the web whereby the pressure of said side legs against said side walls is uniform across each thereof.

References Cited in the file of this patent

UNITED STATES PATENTS

| | | |
|---|---|---|
| 1,781,207 | Wysong | Nov. 11, 1930 |
| 2,583,957 | Marvin | Jan. 29, 1952 |
| 2,589,154 | Smith | Mar. 11, 1952 |

FOREIGN PATENTS

| | | |
|---|---|---|
| 401,085 | Great Britain | Nov. 9, 1933 |
| 425,683 | Great Britain | Mar. 18, 1935 |
| 460,420 | Great Britain | Jan. 27, 1937 |
| 913,136 | France | May 20, 1946 |